(12) United States Patent
Borst et al.

(10) Patent No.: US 8,099,098 B2
(45) Date of Patent: Jan. 17, 2012

(54) METHODS AND APPARATUS FOR PLANNING WIRELESS DATA NETWORKS USING ANALYTICAL MODELING OF USER LEVEL PERFORMANCE

(75) Inventors: Simon C. Borst, Amsterdam (NL); Krishnan Kumaran, Scotch Plains, NJ (US); Kavita Ramanan, Hoboken, NJ (US); Philip A. Whiting, New Providence, NJ (US)

(73) Assignee: Alcatel Lucent, Paris (FR)

( * ) Notice: Subject to any disclaimer, the term of this patent is extended or adjusted under 35 U.S.C. 154(b) by 1551 days.

(21) Appl. No.: 10/422,286

(22) Filed: Apr. 24, 2003

(65) Prior Publication Data

US 2004/0214577 A1    Oct. 28, 2004

(51) Int. Cl.
*H04W 40/00* (2009.01)
(52) U.S. Cl. ............... 455/446; 455/422.1; 455/423
(58) Field of Classification Search .......... 455/446, 455/422.1, 423; 709/223
See application file for complete search history.

(56) References Cited

U.S. PATENT DOCUMENTS

| | | | | |
|---|---|---|---|---|
| 5,561,841 | A * | 10/1996 | Markus ............ | 455/446 |
| 6,456,652 | B1 * | 9/2002 | Kim et al. ......... | 375/224 |
| 2004/0014476 | A1 * | 1/2004 | Barberis et al. .... | 455/446 |
| 2004/0068556 | A1 * | 4/2004 | Radpour ........... | 709/223 |
| 2004/0075606 | A1 * | 4/2004 | Laiho et al. ....... | 342/357.1 |

OTHER PUBLICATIONS

QoS Aware Queuing Analysis for Umts, 2002 IEEE.*

* cited by examiner

*Primary Examiner* — Justin Lee
(74) *Attorney, Agent, or Firm* — Priest & Golstein, PLLC

(57) ABSTRACT

Techniques and systems for planning of wireless networks are described. A system according to an aspect of the present invention receives inputs describing traffic statistics for a wireless network and computes network specifications. The system uses the traffic statistics and network specifications as inputs to a computationally tractable model used to compute parameters for the user level performance of the wireless network. The model may suitably be a processor sharing queuing model. The model employed by the planning system allows analytical solution for the desired user level parameters, given the characteristics and conditions entered as inputs and the intended network layout characteristics. Once a set of user level performance parameters has been computed, the values of the parameters are examined to determine if they meet predetermined requirements, in an iterative process continuing until a set of specifications has been developed that produces parameters meeting the requirements.

3 Claims, 7 Drawing Sheets

METHODS AND APPARATUS FOR PLANNING WIRELESS DATA NETWORKS USING ANALYTICAL MODELING OF USER LEVEL PERFORMANCE

FIELD OF THE INVENTION

The present invention relates generally to improved systems and methods for planning wireless data transmission systems. More particularly, the invention relates to advantageous techniques for modeling user level performance in order to obtain parameters to be considered in construction of wireless data networks.

BACKGROUND OF THE INVENTION

Present day wireless systems provide support for a variety of high speed data applications. In order to achieve user acceptance and satisfaction, a system providing support for these applications must provide an adequate quality of service experience to users at an affordable price. With wireless bandwidth at a premium, traffic engineering and network planning play a vital role in meeting these needs. The use of Internet Protocol (IP) packets, one of the most widely used modes of data communication in wired networks, benefits greatly from the use of scheduling protocols and strategies that help to overcome the problems of scheduling packet transmissions under the widely varying channel conditions typical of most wireless environments. Channel aware and traffic aware scheduling that exploits the delay tolerance of data is a key source of performance enhancement for wireless data networks.

Special characteristics of data networks include higher layers of flow control, the presence of data users, who have more diverse and less predictable traffic behavior than voice users, and who tend to transmit data in bursts, rather than in a continuous stream and the need to support various types of quality of service requirements. These factors tend to make the control and prediction of data performance significantly more complex in data networks. Hence, optimal planning of data networks is considerably more complex than planning of conventional voice networks, and requires particular attention in order to optimize relevant factors.

Planning of wireless data networks requires various computations and considerations to be made in order to design, orient and place various elements of the network. Planning includes optimizing relevant characteristics of the network by adjusting various parameters of base stations employed in the network in order to maximize the coverage and capacity of the network, subject to requirements for the quality of service that must be provided to the users. Parameters to be adjusted include antenna azimuth and down tilt angles, and sector power levels.

In determining the design of a wireless network, it is important to understand the data transmission techniques used by the network, and their effect on the performance of the network as experienced by the users. As each user of a wireless network moves from one location to another, and as other events take place, such as increases and decreases in the number of users to be served, the user may experience changes in channel conditions. In addition, different users may experience differing channel conditions. For example, one user may be in a favorable location and may therefore experience a favorable channel condition, while another user may be in a less favorable location and may experience a less favorable channel condition. In addition, data users exhibit a considerable degree of delay tolerance. A data user typically does not need to receive data in a continuous stream, and may not notice delays in data transmission if the delays are not too severe. Data networks typically employ various scheduling strategies that take advantage of this delay tolerance on the part of individual users in order to achieve greater overall throughput. The transmission rate to a user depends in part on the quality of the channel experienced by the user. In typical scheduling strategies commonly used in wireless networks, a base station transmits more frequently to a user experiencing a favorable channel condition, and transmits less frequently to a user experiencing an unfavorable channel condition.

One commonly used category of scheduling techniques is proportional fair scheduling. During the use of this technique, the throughput of no single user can be improved without reducing the throughputs of the other users by a greater total percentage. This approach is referred to as proportional fairness. User experiences in a network employing a proportional fair scheduling technique can be described using various parameters, such as gain, throughput, blocking probability, and so on. Planning of a network preferably takes into account the specific scheduling strategies to be employed in the network.

One advantageous technique for planning a wireless network involves creating a model yielding various parameters showing the quality of service experienced by the user and establishing the placement and other relevant properties, such as antenna power and orientation, so that the quality of service experienced by the user, as indicated by the parameters generated by the model, meets predetermined requirements. Optimization may occur in an iterative fashion, in which properties of the network elements are repeatedly adjusted and the model parameters recalculated until an optimal set of parameters is achieved. It is theoretically possible to determine values of parameters indicating user level quality of service by performing a simulation of the network operation, obtaining the parameters yielded by the simulation, adjusting the network element properties and repeating the process until optimal results are achieved. However, particularly in cases of complex systems such as wireless data systems, simulation requires significant processing resources and optimization through simulation may present a significant computational burden, especially in cases in which optimization frequently follows an iterative process such as that described above.

There exists, therefore, a need for a system for wireless network planning that generates parameters needed for placement of network elements, including orientation and power of antennas, using techniques that provide rapid execution while maintaining a high degree of accuracy.

SUMMARY OF THE INVENTION

A network planning system according to one aspect of the present invention receives traffic statistic information for a wireless network, and uses a programmed analytical model to compute parameters for the user level performance of the wireless network. The traffic statistic information may suitably include a correlation between signal to noise ratios (SNRs) and transmission rates, preferably in the form of a table presenting the maximum sustainable rate for each of a range of signal to noise ratio (SNR) values. Other traffic statistic information may advantageously include the average file size for file transfers, the average page size for web browsing sessions, and the average number of file transfer requests and page number requests per session.

The planning system creates a layout for the intended network, and develops a set of network specifications for the intended network. The specifications include propagation parameters, including the average path loss between each base station and each point within a cell served by that base station.

The planning system computes user level performance parameters that would be produced using the given network layout and characteristics and the traffic environment in which the network is to operate. The planning system computes user level parameters for a network employing a proportional fair scheduling strategy. The planning system uses traffic statistics describing the environment in which the network is to be used, and propagation parameters determined from the network specifications, in order to compute user level performance parameters describing the user level performance of a network having the postulated characteristics. The parameters that are computed may include expected transfer delay, blocking probability and throughput. The computational techniques employed by the planning system provide for an analytical solution for the desired user level parameters, given the characteristics and conditions entered as inputs and the intended network layout characteristics, without a necessity to perform simulation in order to determine values for the user level parameters. Computation may suitably be performed using a processor sharing queuing model. Such a model provides computational tractability, and is applicable to a number of different scheduling strategies. For example, a processor sharing model can be used to compute parameters for a network using a proportional fair scheduling strategy, but can also be used with other implementations of processor sharing, such as round robin.

Once the values have been computed for a set of user level performance parameters, the values of the parameters are examined to determine if they meet predetermined requirements. If the requirements are not met, adjustments are made to the intended network layout and a new set of user level performance parameters is computed, using the adjusted characteristics and conditions as inputs to the model. Typically, the layout and specifications of a network strike a balance between covering a large area and a large number of users and providing an acceptable quality of service to those users. A planning system according to the present invention makes computations in order determine network specifications in order to strike such a balance and uses a computationally tractable model to compute user level performance.

A more complete understanding of the present invention, as well as further features and advantages, will be apparent from the following Detailed Description and the accompanying drawings.

DETAILED DESCRIPTION

The present invention will be described more fully hereinafter with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Figure 1:
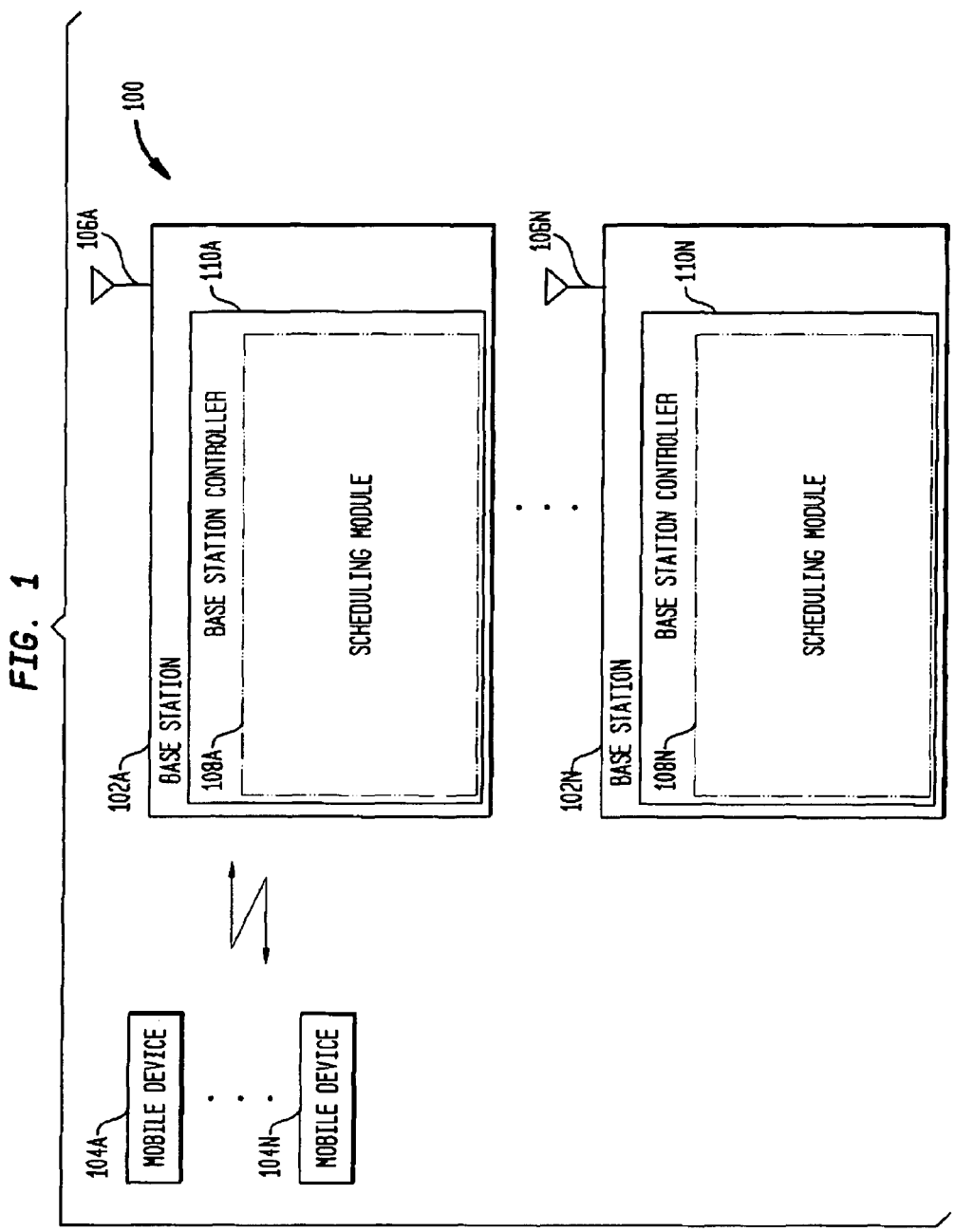
FIG. 1 illustrates a wireless network advantageously designed using the techniques of the present invention.

FIG. 1 illustrates a wireless data transmission system 100, constructed according to the teachings of the present invention. The system 100 includes a plurality of base stations 102A . . . 102N and a number of mobile units 104A . . . 104N. Each of the base stations 102A . . . 102N employs a corresponding antenna 106A . . . 106N. Each of the base stations 102A . . . 102N broadcasts over a service area and transmits signals to and receives signals from one or more of the mobile units 104A . . . 104N within its service area.

Each of the base stations 102A . . . 102N may suitably be controlled by a base station controller 110A . . . 110N, respectively. Each of the base station controllers 110A . . . 110N may suitably be data processing assembly, suitably comprising a processor and memory. The memory suitably stores instructions executed by the processor in order to control the operation of the base station. The memory also suitably stores data generated during the operation of the base station and used by the processor in its operations. For example, a base station may receive information from a mobile unit indicating the signal quality experienced by the mobile unit, and may store that information for use in determining whether to schedule a transmission to or by that mobile unit.

Each of the base station controllers 110A . . . 110N suitably hosts a corresponding scheduling module 108A . . . 108N, preferably implemented as software stored in memory and executed by a processor. Each of the scheduling modules 108A . . . 108N controls communication between the corresponding one of the base stations 102A . . . 102N and the remote units within its service area. Although each of the scheduling modules 108A . . . 108N is illustrated as being implemented in a corresponding one of the base stations 102A . . . 102N, it will be recognized that other implementations are possible. For example, a single server may support some or all of the base stations 102A . . . 102N, and a single scheduling module hosted by the server may direct the operation of all the base stations supported by the server.

The network 100 suitably supports file transfer and web browsing applications. Each of the mobile units 104A . . . 104N may initiate a session with one of the base stations 102A . . . 102N, the particular base station with which the session is conducted depending on the location of the mobile unit initiating the session. The mobile units 104A . . . 104N may move from one service area to another during a session, so that the mobile unit may be served by different base stations during different sessions, and may also be served by different base stations within the same session.

A file transfer session typically involves a single request followed by a relatively continuous transmission of data until the entire file has been transferred. Web browsing sessions differ from file transfer sessions in that a single web browsing session includes a number of page transfers, with arbitrary intervals between transfers as a user examines or otherwise uses the information in the loaded page. Each type of data exchange imposes different demands on the network 100, and a properly designed network provides an acceptable quality of service for each type of data exchange. A wireless network, such as the network 100, is particularly sensitive to the channel condition experienced by a user, and uses selected transmission strategies in order to maintain a desired efficiency of throughput by tailoring the behavior of the network with respect to a particular user to the channel conditions experienced by that user.

Each of the scheduling modules 108A . . . 108N controls when its base station allows communication by a particular mobile unit, suitably following a scheduling procedure whereby a plurality of time slots are defined and a designated mobile unit is allowed an exclusive right to communicate during a particular time slot. The choice of which mobile unit is to be allowed to communicate may be based on predetermined criteria, frequently including the quality of the communication channel experienced by the mobile unit, the time elapsed since the mobile unit in question was last allowed to communicate, whether or not the mobile unit in question is experiencing such a poor channel condition that an attempt to transmit would be futile, and other suitable criteria.

One popular strategy for management of communication is referred to as a proportional fair scheduling strategy. Such a strategy is used, for example, in the CDMA 1xEV-DO, or high data rate (HDR), system. The initials CDMA stand for code division multiple access. Proportional fair scheduling may be carried out in a time slotted fashion, with an exemplary slot duration being 1.67 ms, corresponding to 600 slots per second.

In each time slot, the base station transmits to a single user, which is selected as follows. Suppose there are n mobile units served by the base station, with n being fixed at a particular time in question. Let the data rate control value $DRC_i(t)$ be the feasible transmission rate for the i-th mobile unit in the t-th time slot. The value of $DRC_i(t)$ is an estimate reported by the mobile unit to the base station of the transmission rate that can be supported with a predetermined error probability. The scheduling module, following the proportional fair strategy, allocates the t-th time slot to the mobile unit i for which the ratio $$\frac{DRC_i(t)}{W_i(t)}$$

has the maximum value. $W_i(t)$ represents the smoothed throughput experienced by the mobile unit i at the start of the t-th time slot. Thus, the time slot is not necessarily assigned to the mobile unit with the highest absolute transmission rate, but instead is assigned to the mobile unit whose throughput has the highest value relative to its average received throughput. The value of $W_i(t)$ is updated in each slot according to the formula $W_i(t+1)=\alpha W_i(t)+(1-\alpha)X_i(t)DRC_i(t)$, where $X_i(t)$ takes on a value of 0 or 1 in order to indicate whether or not the i-th user is served in the t-th time slot, and a is the smoothing coefficient. The value of the time constant $1/\alpha$ may be roughly interpreted as the length of the interval over which the throughput is averaged. A suitable value that may be chosen for the time constant $1/\alpha$ is 1000 slots, corresponding to 1.67 seconds.

Design of a system such as the system 100 preferably seeks to optimize user level performance as experienced by the mobile units 104A . . . 104N. In order to determine the performance for the mobile units, it is desirable to construct a model of the performance of the system 100 as experienced at the level of the mobile units 104A . . . 104N. Such models can be employed to compute values for relevant parameters, and elements of the design of the system can be chosen so as to optimize the values generated by the model. The exemplary network 100 illustrated here employs a proportional fair scheduling strategy, but it will be recognized that other networks employing other strategies may be designed and the teachings of the present invention are applicable for design of a wide variety of networks employing a number of different scheduling strategies.

Figure 2:
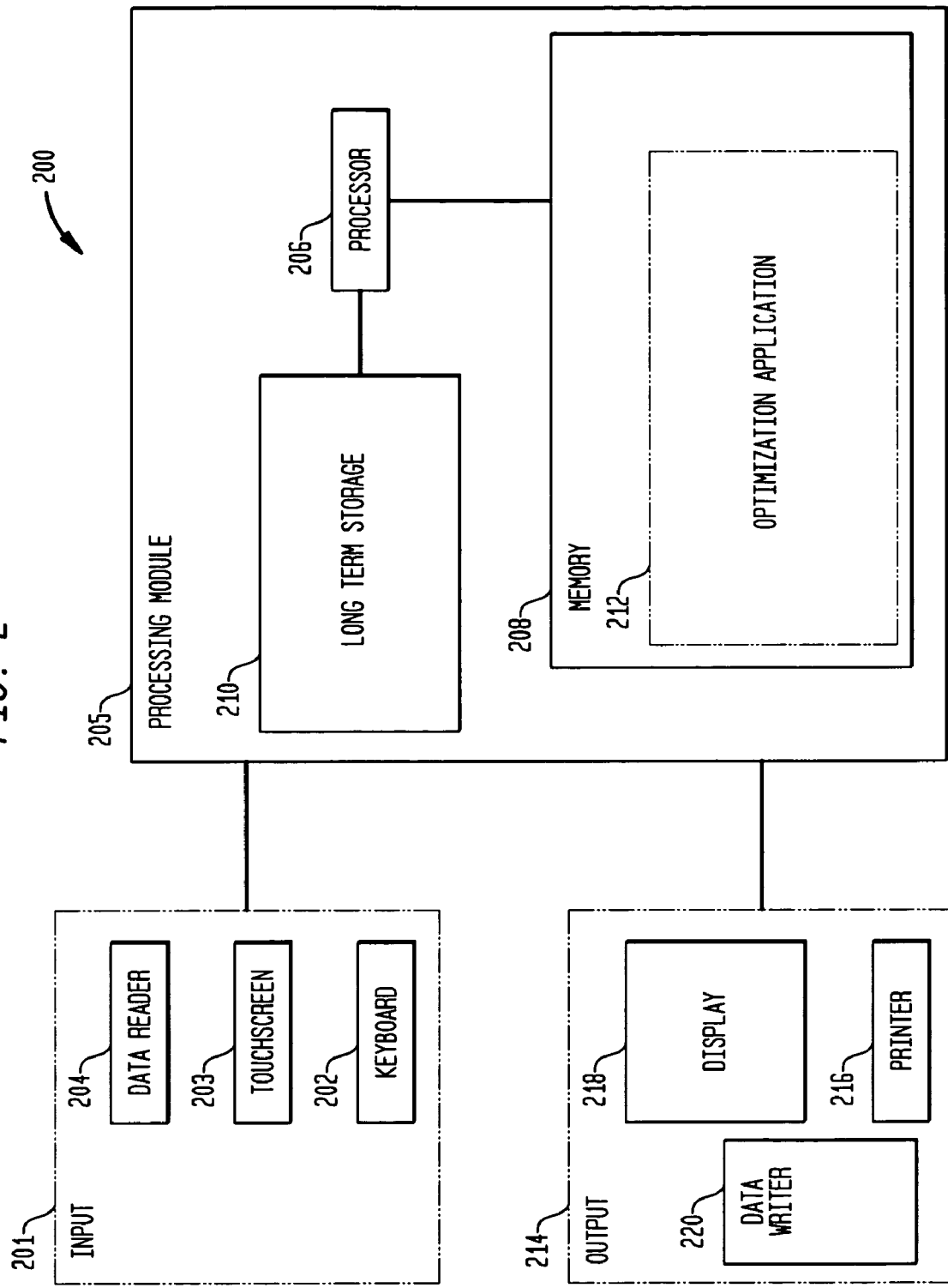
FIG. 2 illustrates a network planning system according to an aspect of the present invention.

FIG. 2 illustrates a network configuration planning system 200 according to an aspect of the present invention. The system 200 may suitably be implemented as a programmed processing system such as a personal computer, workstation, server or the like and may include an input interface 201. The input interface 201 may suitably include one or more elements such as a keyboard 202, touchscreen 203, data reader 204 or the like, allowing entry of traffic conditions for a desired network, as well as information defining the nature and placement of network elements. The system 200 also includes a processing module 205 that receives the parameters and conditions as inputs and determines optimal network properties for a desired network. The processing module 205 may suitably comprise a processor 206, memory 208 and long term storage 210. The processing module 205 may suitably host a network modeling and optimization application 212 that receives network traffic information and user level performance requirements as inputs and generates specifications for a network having properties that will meet the user level performance requirements given the specified network traffic environment. The optimization application 212 is preferably in the form of software residing in memory 208 and executed by the processor 206. The system 200 further includes an output interface 214, suitably including elements such as a printer 216, display 218, data writer 220 or the like, allowing presentation of the specifications that have been developed, for example through printout or display, or formatting and storage of suitable instructions in a file for later retrieval.

The optimization application 212 solves an optimization problem by adjusting various base station parameters, for example antenna azimuth and down-tilt angles, and sector power levels, in order to maximize the coverage and capacity of the network, subject to desired quality of service constraints. The optimization application 212 employs one or more appropriate traffic models for file transfer protocol (ftp) transmission, hypertext markup language page browsing, also known as web browsing, and other common data applications, and uses analytical models to compute parameters indicating user level performance. The optimization application 212 receives inputs defining the demands on the network, and produces outputs defining the quality of service as experienced by the users. The inputs include data defining traffic statistics, that is, the arrival rates of data and the amount of data to be transmitted, on average. These statistics include the transmission rate achieved as a function of signal to noise ratio, preferably presented as a table correlating various transmission rates against various signal to noise ratio values. Additional information related to network traffic demands includes the average file size for file transfer protocol (ftp), the average page size for web browsing and the average number of file requests and page requests per session.

Additional inputs to the optimization application 212 include network characteristics, including the number and locations of base stations and descriptions of relevant features of the base stations, such as transmitting power and receiving range. In many cases, networks such as the network 100 are deployed outdoors and the locations of the base stations are relatively constrained by considerations such as the convenience of acquiring placement rights and the favorability of terrain. In some cases, however, choices can be made as to the desired locations of base stations, and these choices may be guided by techniques known in the art to assist in choosing locations of base stations. In addition, it is sometimes desired to deploy a wireless network such as the network 100 indoors. The placement of base stations will typically be freer, and will depend on such factors as the locations of various building elements that will tend to obstruct or allow the transmission of signals, and the convenience of placing base stations in particular building locations. The intended placement of base stations in such cases can again be determined by techniques known in the art. However the planned deployment of base stations is determined, relevant base station information is provided to the optimization application 212 as an input.

Once the base station layout is determined, the optimization application 212 chooses an antenna configuration for each base station. This configuration may be chosen arbitrarily, in order to provide a starting point for optimization of the network design. Once the base station layout and antenna configurations are established, the optimization application 212 makes computations in order to determine the channel propagation within the service area of each base station. This data includes the average path losses, that is, the reduction in power received by a base station as compared to that transmitted by a user.

The application 212 establishes specifications for an intended network having a specified set of properties and subject to the loads and requirements represented by the submitted parameters. The application 212 then computes parameters defining the user level quality of service for the intended network. Once the quality of service parameters have been computed, the application 212 compares the quality of service parameters against predetermined requirements. If the requirements are not met, the application 212 adjusts the network specifications, and computes a new set of quality of service parameters, as discussed in greater detail below. This process is repeated until a set of properties has been specified that meets desired coverage and quality of service requirements. The quality of service is typically defined in terms of expected transfer delay, blocking and throughput.

Figure 3:
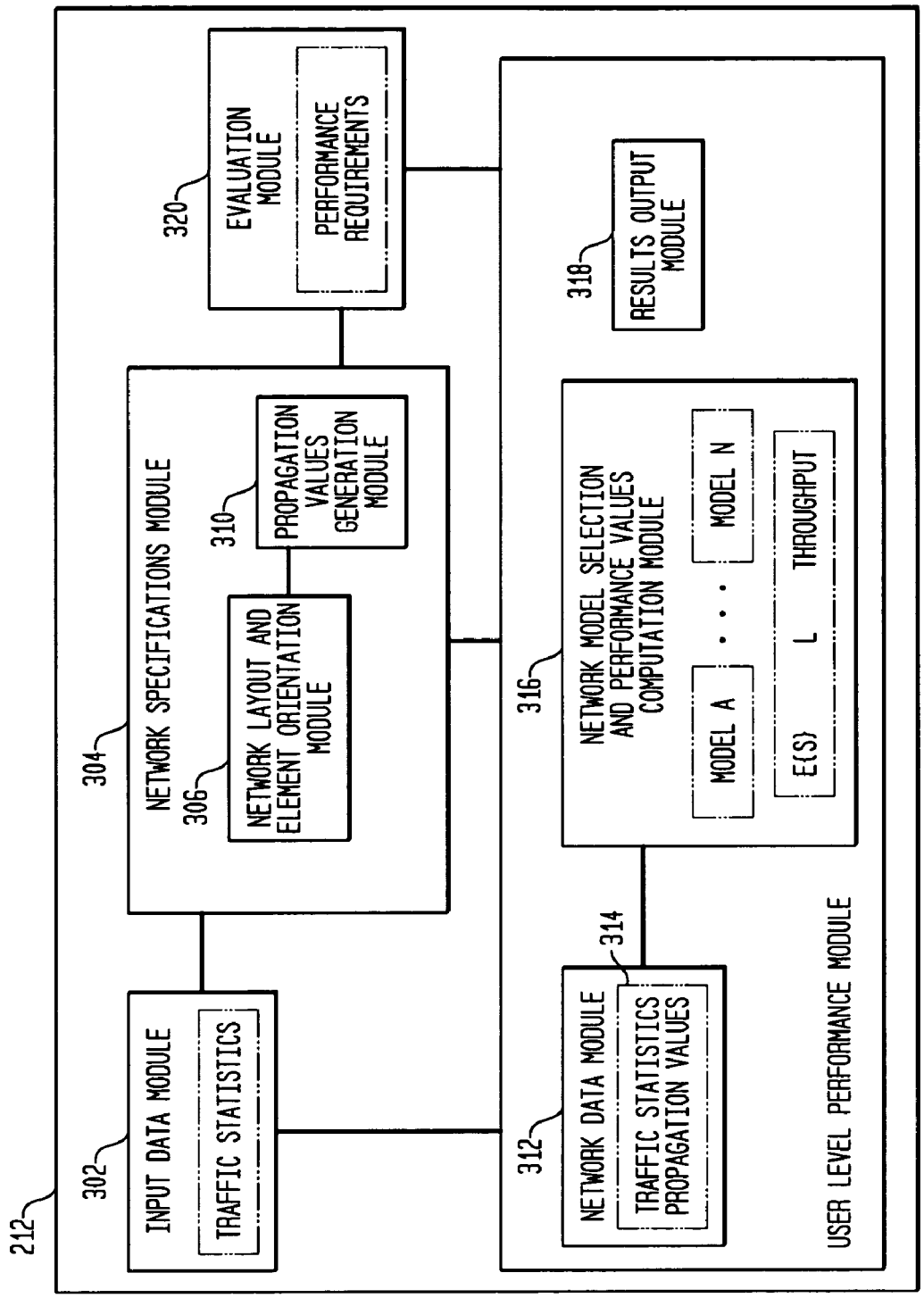
FIG. 3 illustrates details of an optimization application according to an aspect of the present invention.

FIG. 3 illustrates additional details of an optimization application 212, showing the data inputs and outputs and the processing of data for optimization of a network. The optimization application 212 includes an input data module 302, a network specifications module 304 and a user level performance module 312. The input data module 302 receives and stores network traffic statistics, entered as inputs using the input module 201. The network specifications module 304 constructs a design for an intended network according to user selections and information computed based on the user selections.

The network specifications module 304 includes a network layout and orientation module 306, which constructs an initial layout of the base stations, as well as an initial antenna configuration of the base stations. In order to construct the initial layout, the network layout and orientation module 306 employs terrain and propagation environment information, descriptions of the number and types of base stations, base station locations and traffic density proportions within each elementary location of the area covered by the network. Propagation environment information is information relating to the tendency of the environment to allow or retard transmissions of signals, and may be determined from the presence or absence of obstructions within the environment and the nature of the obstructions.

The terrain and propagation environment information and the descriptions of the number and types of base stations may suitably be received as user inputs. The base station locations may also be received as user inputs, or alternatively may be computed based on the terrain and propagation information and coverage requirements, and may employ lists of preferred and prohibited locations in order to guide the selection of locations.

The network specifications module 304 further includes a propagation values module 310. The propagation values generation module 310 computes a set of propagation values corresponding to the operation of the intended network produced by the network layout and orientation module 306. This set of propagation values may suitably be based at least in part on the orientations of and power supplied to the antennas associated with each base station, and is computed based on signal propagation from the antennas to the expected average layout of user locations in areas served by each base station.

The initial network layout generated by the network layout and orientation module 306 is based on an arbitrary balance between coverage and quality of service. In order to generate propagation values based on the network specifications produced by the network layout and orientation module 306, the propagation values generation module 310 employs standard models of wireless traffic, and uses these models and the network traffic statistics to generate network propagation values using cumulative distribution functions. The propagation values generation module 310 suitably models network traffic as a mesh, that is, a plane graph. Each vertex of the plane graph represents a potential location for wireless users, and the distribution of the vertices represents the distribution of wireless traffic. For additional flexibility in the representation, each vertex is annotated with a value that represents an estimate of the traffic loads of users at its location. These may suitably be measured in Erlang values. Erlang values are a standard measure of traffic capacity.

In addition, for each location and each sector, the path loss to the location from the sector is calculated. In order to determine the contribution of a given location to a sector's load, the network specifications module 304 uses a simple model of shadow fading. Together with the path loss estimates and sector power levels, this shadow fading model implies, at a given location, a probability for each sector that the sector has the maximum signal to noise ratio and therefore will be serving traffic for the location. These probabilities, together with the SNR estimates for each location and sector pair, and Erlang values for each location, constitute the cumulative distribution functions needed to compute the key propagation values for modeling of a wireless network.

Once propagation values have been computed, they are supplied to a user level performance module 312, which computes user level performance parameters for the specified network. The user level performance module 312 includes a network data module 314, for storing and assembling traffic and propagation data, a network model selection and performance values computation module 316 for selecting appropriate computations based on the expected network usage and performing the selected computations using the traffic and propagation data as inputs in order to compute parameters indicating user level performance. The network model selection and performance values computation module 316 may suitably employ two different models, one representing file transfer protocol sessions and one representing web browsing sessions, selected from a library of suitable models. It will be recognized, however, a single model, or more than two models may be used, depending on the performance characteristics of the expected users of the network. In computing performance values using the models, the module 316 may suitably weight the results produced by the different models depending on expected usage patterns such as the number of file transfer protocol and web browsing sessions. The module 316 may combine the weighted results to compute the user performance characteristics. The user level performance module 312 further includes a results output module 318 for assembling and storing the user level parameters.

Once the user level parameters have been computed, they are then supplied to an evaluation module 320, which compares the user level parameters against predetermined requirements and determines if the user level parameters are satisfactory. The evaluation module 320 then provides evaluation information to the network specifications module 304, which adjusts the network properties based on the evaluation information, so that the network will produce improved user level parameters. Specifically, the propagation values generation module 310 adjusts the propagation values and the network layout and element orientation module 306 produces a network layout that will produce the improved propagation values. New user level parameters are computed based on the new specifications and propagation values, the parameters are evaluated, and so on, until a network specification has been produced that generates acceptable parameters. If desired, it is not necessary for the network layout and element orientation module 306 to produce new specifications at every iteration. Instead, the propagation values can be adjusted at each iteration and then, when a set of propagation values has been computed that produces satisfactory user level performance parameters, a network layout can be produced that will provide the propagation values that produced the satisfactory user level parameters.

The user level performance module 306 employs the network propagation values and network traffic values as inputs to a model used to compute parameters indicating user level quality of service. These parameters are expected transfer delay, blocking probability and throughput. Expected transfer delay and blocking probability are represented by the variables E{S} and L, respectively. Depending on the choices made for the network planning system 200, values for throughput may be generated for ftp data transfer, web browsing or a combination of the two. For ftp data transfer, the throughput is the product of the arrival rate, one minus the blocking probability, expressed above as (1−L), and average file size. For web browsing, the throughput is the product of the arrival rate, one minus the blocking probability and average hypertext markup language page size. In symbolic terms, if the arrival rate is λ and the mean file size is F, the throughput for ftp data transfer is λ *F*(1−L). If the arrival rate is λ and the mean page size is W, the throughput for web browsing is λ *W*(1−L). Depending on the anticipated conditions under which the planned network is to operate, the user level performance module 306 may suitably be programmed to model ftp data transfer, web browsing, or a combination of ftp and web browsing, taking into account estimated probabilities that a data request will be a web browsing request or a file transfer request.

The user level performance module 306 preferably employs a processor sharing queuing model. Such a model is suitable for describing the performance of a system using a proportional fair scheduling strategy, and computes parameters defining the user quality of service in an analytical fashion, without a need to perform simulation in order to generate the parameters. While capturing the essential features of the proportional fair scheduling strategy, this model provides several advantageous features including analytical tractability, computational simplicity and robustness to parameters that describe traffic and channel statistics. The model uses traffic statistics and propagation information as inputs, and computes the user level performance parameters, that is, expected delay, blocking probability and throughput in a direct analytical computation. Details of the development of the model are presented below. It will be recognized that while the present implementation described here is directed toward the computation of parameters for a network using a proportional fair scheduling strategy, a processor sharing model can be used to compute parameters for other networks employing other strategies encompassed by processor sharing. One specific example of an alternative scheduling strategy for which a processor sharing model may be used is round robin scheduling, and numerous additional alternatives exist.

The models described below provide estimates for performance measures used to determine the quality of service of a network as perceived by the users of the network. These measures can be used to determine whether a particular network configuration provides acceptable quality of service, and to compare the quality of service provided by different configurations in order to achieve an optimal configuration. The various formulas are expressed in terms of system parameters, including the file arrival rate λ, the mean file size τ, the feedback probability p, the conversion factor κ and the gain function G(n). Conceptually, these parameters may be separated into two classes. The first class is the set of parameters describing the traffic characteristics. These parameters are λ, τ and p, and are provided as user inputs. The second class is the set of parameters characterizing the rate statistics. These parameters are κ and G(n), and are dependent on the propagation environment. The parameters κ and G(n) may be computed provided that the users have independent Rayleigh fading channels.

Most of the performance metrics considered, other than the absolute mean transfer delay, depend only on traffic descriptors through the quantity $\xi:=\lambda\tau/(1-p)$, which represents the total volume of the offered traffic in bits. Thus, for most performance metrics it is sufficient to quantify the total volume of the offered data traffic, without necessarily having to specify all the individual traffic descriptors.

In many wireless systems, the instantaneous data rate control (DRC) value is determined by an instantaneous signal to noise ratio, according to some thresholding function. That is, a particular DRC value can be sustained if the signal to noise ratio is at or above a specified threshold, with signal to noise ratios at or above higher thresholds being able to sustain higher DRC values. A table correlating signal to noise ratios to DRC values for a commonly used system, the CDMA 1xEV-DO system, is presented below. The values in this table can be used as an example in the discussion below.

| SNR threshold (dB) | −12.5 | −9.5 | −8.5 | −6.5 | −5.7 | −4 | −1 | 1.3 | 3 | 7.2 | 9.5 |
|---|---|---|---|---|---|---|---|---|---|---|---|
| Rates (kbps) | 38.4 | 76.8 | 102.6 | 153.6 | 204.8 | 307.2 | 614.4 | 921.6 | 1228.8 | 1843.2 | 2457.6 |

Let $x_1, \ldots, x_{11}$ and $y_1, \ldots, y_{11}$ be the entries for the SNR estimate and the DRC value shown in the table above. Because the users have Rayleigh fading channels, the probability that the instantaneous SNR of a user with mean SNR γ, expressed in dB, exceeds some value x is $P\{SNR(\gamma)\}=e^{-10^{(x-\gamma)/10}}$. Hence, the probability that the instantaneous DRC value of a user with mean SNR γ equals $y_\tau$ is $p_\tau(\gamma):=P\{DRC$ $(\gamma) = y_\tau\} = P\{x_\tau < SNR(\gamma) < x_{\tau+1}\} = e^{-10(x_\tau - \gamma)/10} - e^{-10(x_{\tau+1} - \gamma)/10}$,
with the convention that $x_{12} = \infty$. The time average transmission rate of a user with mean SNR $\gamma$ may then be determined as the expectation $$R(\gamma) := E\{DRC(\gamma)\} = \sum_{\tau=1}^{11} y_\tau p_\tau(\gamma). \quad (1)$$

Suppose all users have the same mean SNR $\gamma$. In that case, the time average transmission rate is also the same for all users, so that the conversion factor is simply $\kappa = 1/R(\gamma)$. The gain factor $G(n, \gamma)$ may then be expressed as:

$$G(n, \gamma) = E\{\max\{DRC_1(\gamma)/R(\gamma), \ldots, DRC_n(\gamma)/R(\gamma)\}\} \quad (2)$$

$$= \frac{1}{R(\gamma)} E\{DRC_1(\gamma)/R(\gamma), \ldots, DRC_n(\gamma)\}\}$$

$$= \frac{1}{R(\gamma)} \sum_{\tau=1}^{11} y_\tau (q_{\tau-1}(\gamma)^n - q_\tau(\gamma)^n),$$

where $q_\tau(\gamma) := P\{DRC(\gamma) \leq y_\tau\} = p_1(\gamma) + \ldots + p_\tau(\gamma)$.

It can be assumed that the mean SNR $\Gamma$ varies across users according to some general distribution function $P(\gamma) = P\{\Gamma < \gamma\}$. In that case, the conversion factor may be determined by calculating the expectation of $1/R(\gamma)$ with respect to $P(\bullet)$, to yield the result $$\kappa = \int_{\gamma=-\infty}^{\infty} \frac{1}{R(\gamma)} dP(\gamma). \quad (3)$$

With different mean values for the SNR, it is no longer the case that the relative rate fluctuations are statistically identical for all users. Due to the truncation and concavity of the DRC value, the relative rate fluctuations tend to be smaller for users experiencing a higher SNR. This phenomenon suggests that the gain factor will tend to be lower for high SNR users as well. Because the rate fluctuations are no longer statistically identical, it will typically not be the case that each user is served at the same fraction of its time average transmission rate. In that case, the notion of a gain factor as previously defined will not be strictly valid. In order to continue to use the analytical formulas for the processor sharing model, an approximate gain factor may be employed. This approximate gain factor may be computed as the gain factor that would have been obtained in a scenario with the same mean SNR for all users, where the mean is taken to the average across all users, with respect to $P(\bullet)$. This approximate gain factor is expressed as follows:

$$G(n) = \int_{\gamma=-\infty}^{\infty} G(n,\gamma) dP(\gamma). \quad (4)$$

The user level performance of a system such as the system 100, employing a proportional fair scheduling strategy, may suitably be modeled by taking into account the fact that in typical circumstances, the time slot duration employed by base stations within the system is relatively short compared to the time scale of interest for evaluating user level performance. A suitable model, therefore, may be a continuous time model that evolves on a slower time sale, where all mobile units are served simultaneously at possibly distinct but constant rates. When there are n active mobile units, each mobile unit i is assumed to be served at a fraction F(n) of the time average transmission rate $R_i$ that it would receive if it were the only mobile unit in the system. Such an assumption is best modeled by a queuing model with a processor sharing discipline.

The assumption that each user is served at the same fraction of its time-average transmission rate can be rigorously justified in the case of a fixed population of infinitely backlogged users whose relative rate fluctuations around the respective time average values are statistically identical. Suitable assumptions are the presence of n infinitely backlogged users, with $(DRC_1 \ldots DRC_n)$ being a random vector with a distribution that is the stationary distribution of the instantaneous feasible rates. Assume the equation $$DRC_i \stackrel{d}{=} R_i Y_i Z,$$

where $R_i$ is the time average transmission rate of the mobile unit i, $Y_1, \ldots, Y_n$ are independent and identically distributed copies and $Z$ represents a possible correlation component with unit mean. Assume that $(W_1, \ldots, W_n)$ is a random vector whose distribution is the stationary distribution of the exponentially smoothed throughputs maintained by the proportional fair strategy, noting that the proportional fair strategy allocates a time slot to the mobile unit having the maximum instantaneous value of the ratio $$\frac{DRC_i(t)}{W_i(t)}.$$

Thus, the expected rate of the selected mobile unit i when selected is $$E\left\{DRC_i \mid \frac{DRC_i}{W_i} = \max_{j=1,\ldots,n} \frac{DRC_j}{W_j}\right\}. \quad (5)$$

Both the instantaneous rate $DRC_i$ and the exponentially smoothed throughput $W_i$ scale linearly with the time average rate $R_i$ in the case in which the relative rate fluctuations are statistically identical as described above. As a result, the allocation of time slots only depends on the relative rate fluctuations and not on the time average rates of the various mobile units. Thus, each mobile unit receives a fraction 1/n of the time slots, and the equation above may be solved to yield the equation $$W_i \stackrel{d}{=} R_i V_i,$$

where the random variables $V_1, \ldots, V_n$ are identically distributed but not independent. In addition, the exponentially smoothed throughputs will not show any significant variation when the time constant $1/\alpha$ in the exponential smoothing is large. That is, for some constant $V, V_1, \ldots, V_n \approx V$. Substituting $$DRC_i \stackrel{d}{=} R_i Y_i Z$$

and $W_i \approx R_i$ in equation (3) above yields an expression for the expected rate of the mobile unit i when selected. This expression is as follows:

$$E = \left\{ R_i Y_i Z \mid Y_i = \max_{j=1,\ldots,n} Y_j \right\} = R_i E \left\{ \max_{j=1,\ldots,n} Y_j \right\} = R_i G(n), \quad (6)$$

where $$G(n) = E \left\{ \max_{j=1,\ldots,n} Y_j \right\}. \quad (7)$$

When the relative rate fluctuations are statistically identical and the time constant $1/\alpha$ in the exponential smoothing is not too small, the proportional fair scheduling strategy provides each mobile unit i with the same fraction $F(n)=G(n)/n$ of its time average transmission rate $R_i$. The gain factor $G(n)$ reflects the scheduling gains that the proportional fair scheduling strategy extracts from the rate fluctuations, which increase with the number of mobile units.

The assumption that the relative rate fluctuations are statistically identical is roughly valid when the mobile units, for example, have Rayleigh fading channels and the feasible rate is approximately linear in the signal to noise ratio. The latter approximation is reasonably accurate when the signal to noise ratio is not too high. It is not necessary that the Doppler frequencies be identical, because the instantaneous rate distribution does not significantly affect the long term average throughput when the time constant in the exponential smoothing is sufficiently large. The Doppler frequencies are significant for the transient throughput behavior and also affect the ability to predict the feasible rate. Also, it is possible to relax the assumption $$DRC_i \stackrel{d}{=} R_i Y_i Z$$

to some degree. For example, a somewhat milder condition would be that $P\{(DRC_1/R_1, \ldots DRC_n/R_n) \leq t_\pi(1), \ldots, t_\pi(n)\}$ is invariant under permutations $\pi(1), \ldots, \pi(n)$.

The preceding discussion is applicable to the case of a fixed population of infinitely backlogged users. In actual use, a wireless data network can be expected to experience a varying number of users, with file transfer requests being submitted at arbitrary intervals, according to the needs of the users. However, if the backlog periods are relatively long, that is, if the number of active users varies relatively slowly compared to the time scale on which the proportional fair scheduling strategy operates, the above observations remain approximately valid and it is plausible to assume a separation of time scales, where each user is continuously served at a rate $H(n)/n$, in bits per second. That is, each user is served at a fraction $G(n)/n$ of its time-average rate, whenever there are n active users.

The user performance module 306 may suitably employ a model for file transfer protocol (ftp) sessions, web browsing sessions or a combination of the two types of sessions, with each type of session being given a probabilistic weighting, depending on estimates of the proportion of the total traffic load presented by each type of session. A different model is employed for each type of session, and models of each type of session are discussed below. The models discussed are a simplified model, a model in which a constraint is imposed on the total number of users, and a model assuming a general gain function.

The user performance module 306 preferably employs a model for each type of session that imposes a constraint on the total number of users. Each model generates parameters defining the quality of service as experienced by the users. These parameters are expected transfer delay $E\{S\}$, blocking probability L and throughput. For ftp sessions, throughput is the product of arrival rate, mean file size and one minus the blocking probability (1−L). For web browsing sessions, throughput is the product of arrival rate, mean page size, average number of pages and (1−L).

The user performance module 306 preferably uses a finite capacity model for each type of session. Specifically, the user performance module 306 preferably uses the equation (12) below to compute the blocking probability L for an ftp session and preferably uses the equation (14) below to compute the expected user delay $E\{S\}$ for an ftp session. The user performance module 306 preferably uses the equation (26) below to compute the blocking probability L for a web browsing session and preferably uses the equation (28) below to compute the expected user delay $E\{S\}$ for a web browsing session. Details of these models and various related models are discussed below.

In order to model ftp sessions, it can be assumed that file transfer requests are a Poisson process of rate $\lambda$. The file sizes T follow some general distribution with mean $\tau$ less than infinity. The time average transmission rate of an arbitrary user if it were the only user in the system can be designated as R. In this case, the effective service requirement for an arbitrary transfer request, measured in seconds of transmission time rather than bits, is $B=T/R$, with mean $\beta = \tau \ast \kappa$, where $\kappa := E\{1/R\}$ may be interpreted as a conversion factor for conversion from bits to seconds. The effective service requirement is the amount of time it would take to complete the file transfer if a user were the only user in the system.

The traffic intensity can be defined by $\rho := \lambda \ast \beta$. Let N be the number of active users, that is, file transfers in progress, at an arbitrary point in time. Let S be the transfer delay incurred by an arbitrary user.

The first case to be considered is the simplified case in which $G(n)=G=1$, which corresponds to static round robin scheduling and ignores the scheduling gains achieved by the proportional fair scheduling strategy. In this case, $$P\{N=n\}=(1-\rho)\rho^n, \text{ where } n=0, 1, 2, \ldots,$$

so that $$E\{N\} = \frac{\rho}{1-\rho}.$$

Applying Little's law yields the following value for the expected transfer delay:

$$E\{S\} = \frac{\beta}{1-\rho}. \quad (8)$$

The above equation reflects the insensitivity property of the processor sharing discipline, which shows that the mean transfer delay depends only on the service requirement distribution through its mean. In fact, it can be shown that the conditional expected transfer delay is as follows:

$$E\{S \mid B\} = \frac{b}{1-\rho}. \qquad (9)$$

Thus, the expected transfer delay incurred by a user is proportional to the service requirement, with a factor of proportionality $$D = \frac{1}{1-\rho}. \qquad (10)$$

This property embodies a certain fairness principle, which implies that users with larger service requirements tend to experience longer transfer delays.

Next to be considered is a finite capacity variant of the above model, where at most K users are simultaneously admitted into the system. Users which submit requests when there are already K transfers in progress are denied access. In that case, the distribution of the number of active users at an arbitrary point in time is given by:

$$P\{N = n\} = \frac{(1-\rho)\rho^n}{1-\rho^{K+1}}, \qquad (11)$$

for n=0, 1, ..., K.
In particular, the blocking probability is $$L = P\{N = K\} = \frac{(1-\rho)\rho^n}{1-\rho^{K+1}}, \qquad (12)$$

And the mean number of file transfers in progress at an arbitrary point in time is $$E\{N\} = \frac{1}{1-\rho} - \frac{(K+1)\rho^{K+1}}{1-\rho^{K+1}} \qquad (13)$$
$$= \frac{1}{1-\rho} - \left(1 - \frac{(K+1)(1-\rho)\rho^{KJ}}{1-\rho^{K+1}}\right).$$

Using Little's law, the mean transfer delay incurred by an arbitrary user is:

$$E\{S\} = \frac{\beta}{1-\rho} - \left(1 - \frac{K(1-\rho)\rho^K}{1-\rho^K}\right). \qquad (14)$$

As before, it can be shown that the conditional expected transfer delay is:

$$E\{S \mid B = b\} = \frac{b}{1-\rho} - 1 - \frac{K(1-\rho)\rho^K}{1-\rho^K}. \qquad (15)$$

Thus, the expected transfer delay incurred by a user is proportional to the service requirement, with a factor of proportionality as follows:

$$D(K) = \frac{1}{1-\rho} - 1 - \frac{K(1-\rho)\rho^K}{1-\rho^K}. \qquad (16)$$

The model of a finite capacity system is more complicated, but retains the insensitivity and proportionality properties. It is easily verified that the factor D(K) increases as the admission threshold K increases, being equal to 1 for K=1, and approaching $$\frac{1}{1-\rho}$$

as K approaches infinity. By contrast, the blocking probability L decreases as K increases. This property reflects the usual tradeoff between quality of service, as experienced by users admitted to the system, and system capacity, in terms of the proportion of users admitted. Design of a network seeks to strike a desired balance between these two objectives.

The next variant to be considered is the case of a general gain function G(n). In such a case, $$P\{N = n\} = H(K)^{-1} \frac{\rho^n}{\phi(n)}, \qquad (17)$$

For n=0, 1, ..., K, and where adopting the convention that an empty $$\phi(n) := \prod_{i=1}^{n} G(i),$$

product is equal to 1, and with a normalization constant $$H(K) := \sum_{n=0}^{K} \frac{\rho^n}{\phi(n)}.$$

The blocking probability L is given by $$L = P\{N = K\} = H(K)^{-1} := \frac{\rho^K}{\phi(n)}. \qquad (18)$$

$$E\{N\} = H(K)^{-1} \sum_{n=0}^{K} \frac{n\rho^n}{\phi(n)}. \qquad (19)$$

Using Little's law yields the following expression for $E\{S\}$:

$$E\{S\} = \frac{E\{N\}}{\lambda(1-L)^{-1}} = \beta H(K)^{-1}(1-L)^{-1} \sum_{n=0}^{K} \frac{n\rho^{n-1}}{\phi(n)}. \qquad (20)$$

As before, it may be shown that $$E\{S \mid B\} = \frac{b}{\beta} E\{S\} = bH(K)^{-1}(1-L)^{-1} \sum_{n=0}^{K} \frac{n\rho^{n-1}}{\phi(n)}. \quad (21)$$

Thus, the expected transfer delay experienced by a user is proportional to the service requirement, with a factor of proportionality $$D(K) = \frac{E\{S\}}{\beta} = H(K)^{-1}(1-L)^{-1} \sum_{n=0}^{K} \frac{n\rho^{n-1}}{\phi(n)}. \quad (22)$$

Web browsing sessions differ from file transfer sessions in that a single web browsing session includes a number of page transfers, with arbitrary intervals between transfers as a user examines or otherwise uses the information in the loaded page. A model of a web browsing session has many of the same characteristics as the ftp file transfer model described above, but includes modifications in order to take into account the differences between file transfer sessions and web browsing sessions.

A web browsing model may be developed as follows. Once a transfer has been completed, the user initiates a subsequent request with probability p<1. The time until the next request is generated follows a general distribution with mean α. With probability 1−p, the user leaves the system. Thus, the total number of transfer requests generated by a user is geometrically distributed with parameter p. The file sizes T of the successive requests of a user are assumed to be independent. The time average transmission rate R of a user, however, is assumed to be constant for the duration of the entire sequence of requests. The system just described may be modeled as a two node queuing network, with a single-server processor-sharing node and in infinite-server node representing the time periods between successive requests. Define $$\sigma := \frac{\rho}{1-\rho}.$$

As before, let N be the number of active users at an arbitrary point in time. In the present example, the number of active users is the number of transfers actually in progress. Let S be the delay of an arbitrary transfer. The first case to be described is the simplified case where G(n)=G=1, which essentially corresponds to static round robin scheduling and omits the throughput gains that the proportional fair scheduling strategy extracts by exploiting rate variation.

In this case, $P\{N=n\} = (1-\sigma)\sigma^n$, where n=0, 1, 2, ..., so that $$E\{N\} = \frac{\sigma}{1-\sigma}$$

Applying Little's law yields the following value for the expected transfer delay:

$$E\{S\} = \frac{\beta}{1-\sigma}. \quad (23)$$

This relationship reflects the insensitivity property of the processor sharing discipline, which shows that the mean transfer delay depends only on the service requirement distribution through its mean. In fact, it can be shown that the conditional expected transfer delay is as follows:

$$E\{S \mid B\} = \frac{b}{1-\sigma}. \quad (24)$$

As before, the next model to be considered may suitably be a finite capacity variant of the above model, where at most K users are simultaneously admitted into the system. Users which submit requests when there are already K transfers in progress are denied access, but continue to generate further requests as if the transfer had been completed. The distribution of the number of transfers at an arbitrary point in time is then given by $$P\{N=n\} = \frac{(1-\sigma)\sigma^n}{1-\sigma^{K+1}}, \text{ for } n = 0, 1, \ldots, K. \quad (25)$$

In particular, the blocking probability is $$L = P\{N=K\} = \frac{(1-\sigma)\sigma^K}{1-\sigma^{K+1}}, \quad (26)$$

and the mean number of active users at an arbitrary point in time is $$E\{N\} = \frac{\sigma}{1-\sigma} - \frac{(K+1)\sigma^{K+1}}{1-\sigma^{K+1}},$$

which is equivalent to $$E\{N\} = \frac{\sigma}{1-\sigma} - 1 - \frac{(K+1)(1-\sigma)\sigma^K}{1-\sigma^{K+1}}. \quad (27)$$

Using Little's law, the mean delay of an arbitrary transfer is expressed as follows:

$$E\{S\} = \frac{\beta}{1-\sigma} - 1 - \frac{K(1-\sigma)\sigma^K}{1-\sigma^K}. \quad (28)$$

As before, the conditional expected transfer delay is $$E\{S \mid B=b\} = \frac{b}{1-\sigma} - 1 - \frac{K(1-\sigma)\sigma^K}{1-\sigma^K}. \quad (29)$$

The next case to be considered is the case of a general gain function G(n). In such a case, $$P\{N = n\} = H(K)^{-1} \frac{\sigma^n}{\phi(n)}, \quad (30)$$

For n=0, 1, ..., K, and where $$\phi(n) := \prod_{i=1}^{n} G(i),$$

adopting the convention that an empty product is equal to 1, and with a normalization constant $$H(K) := \sum_{n=0}^{K} \frac{\sigma^n}{\varphi(n)}.$$

The blocking probability L is given by $$L = P\{N = K\} = H(K)^{-1} := \frac{\sigma^K}{\phi(K)}, \quad (31)$$

and the main number of users at an arbitrary point in time is $$E\{N\} = H(K)^{-1} \sum_{n=0}^{K} \frac{n\sigma^n}{\phi(n)}. \quad (32)$$

Using Little's law yields the following expression for E{S}:

$$E\{S\} = \frac{E\{N\}}{\lambda(1-L)^{-1}} = \beta H(K)^{-1}(1-L)^{-1} \sum_{n=0}^{K} \frac{n\sigma^{n-1}}{\phi(n)}. \quad (33)$$

As before, it may be shown that $$E\{S \mid B\} = \frac{b}{\beta} E\{S\} = bH(K)^{-1}(1-L)^{-1} \sum_{n=0}^{K} \frac{n\sigma^{n-1}}{\phi(n)}. \quad (34)$$

Thus, the expected transfer delay experienced by a user is proportional to the service requirement, with a factor of proportionality $$D(K) = \frac{E\{S\}}{\beta} = H(K)^{-1}(1-L)^{-1} \sum_{n=0}^{K} \frac{n\sigma^{n-1}}{\phi(n)}. \quad (35)$$

It will be recognized that the above formulas for a general gain function are structurally similar to the equivalent formulas for the case of ftp file transfer, but with σ being substituted for ρ.

An alternative model to produce parameters for web browsing is a closed version of the model presented above. This model assumes a fixed population of K active users in a system. Once a transfer has been completed, a user submits the next request after a generally distributed period with mean α. This assumed operation may be modeled as a two node queuing network with a fixed population of K customers, a single server processor sharing node and an infinite server node. The latter model has been extensively studied in the literature under the name the machine repair model or computer terminal model.

The first step in developing the model is to define the variable ν, for convenience of expression. The value of ν is given by ν:=α/β. Then, $$P\{N = n\} = H(K)^{-1} \frac{\nu^{K-n}}{(K-n)!}, \quad (36)$$

with a normalization constant $$H(K) = \sum_{n=0}^{K} \frac{\nu^n}{n!}.$$

Using the arrival theorem for closed queuing networks yields the expression for E{S}

$$E\{S\} = K\beta - \alpha \frac{H(K-2)}{H(K-1)}, \quad (37)$$

and $$E\{S \mid B\} = K\beta - \left(K - \frac{\alpha}{\beta} \frac{H(K-2)}{H(K-1)}\right)b. \quad (38)$$

Finally, the above close model version can be considered in combination with a general gain function G(n). This variant yields the following expressions:

$$P\{N = n\} = H(K)^{-1} \frac{\nu^{K-n}}{\phi(n)(K-n)!}, \quad (39)$$

with $$\phi(n) := \prod_{i=1}^{n} G(i)$$

and normalization constant $$H(K) = \sum_{n=0}^{K} \frac{\nu^n}{\phi(n)(K-n)!}.$$

Using the arrival theorem for closed queuing networks yields $$E\{S\} = K\beta - \frac{\alpha}{H(K-1)} \sum_{n=0}^{K-2} \frac{v^n}{\phi(n+1)n!} \quad (40)$$

and $$E\{S \mid B = b\} = E\{S\} = \left(K - \frac{\alpha}{\beta H(K-1)} \sum_{n=0}^{K-2} \frac{v^n}{\phi(n+1)n!}\right) b \quad (41)$$

In order to compute user level performance parameters, the user level performance module 306, computes values for κ and G(n) employing the user inputs λ, τ and p, the table showing correlations between signal to noise ratios and transmission rates, and other relevant data. These computations are performed using equations 1-4, above, with equations 3 and 4 yielding the values for κ and G(n). Then, depending on the specific design of and selections made for the user level performance module 306, appropriate values are computed for the expected delay E{S}, blocking probability L, and throughput. If desired, the optimization application 212 may be designed so that user inputs are received indicating the expected usage. For example, expected proportions of web browsing and file transfer may be received as inputs. In such a case, the user level performance module 306 may compute the values of E{S}, L and throughput by computing values for each model used to represent a portion of the expected traffic, and computing a composite value representing a weighted average of the values produced by each model.

Figure 4:
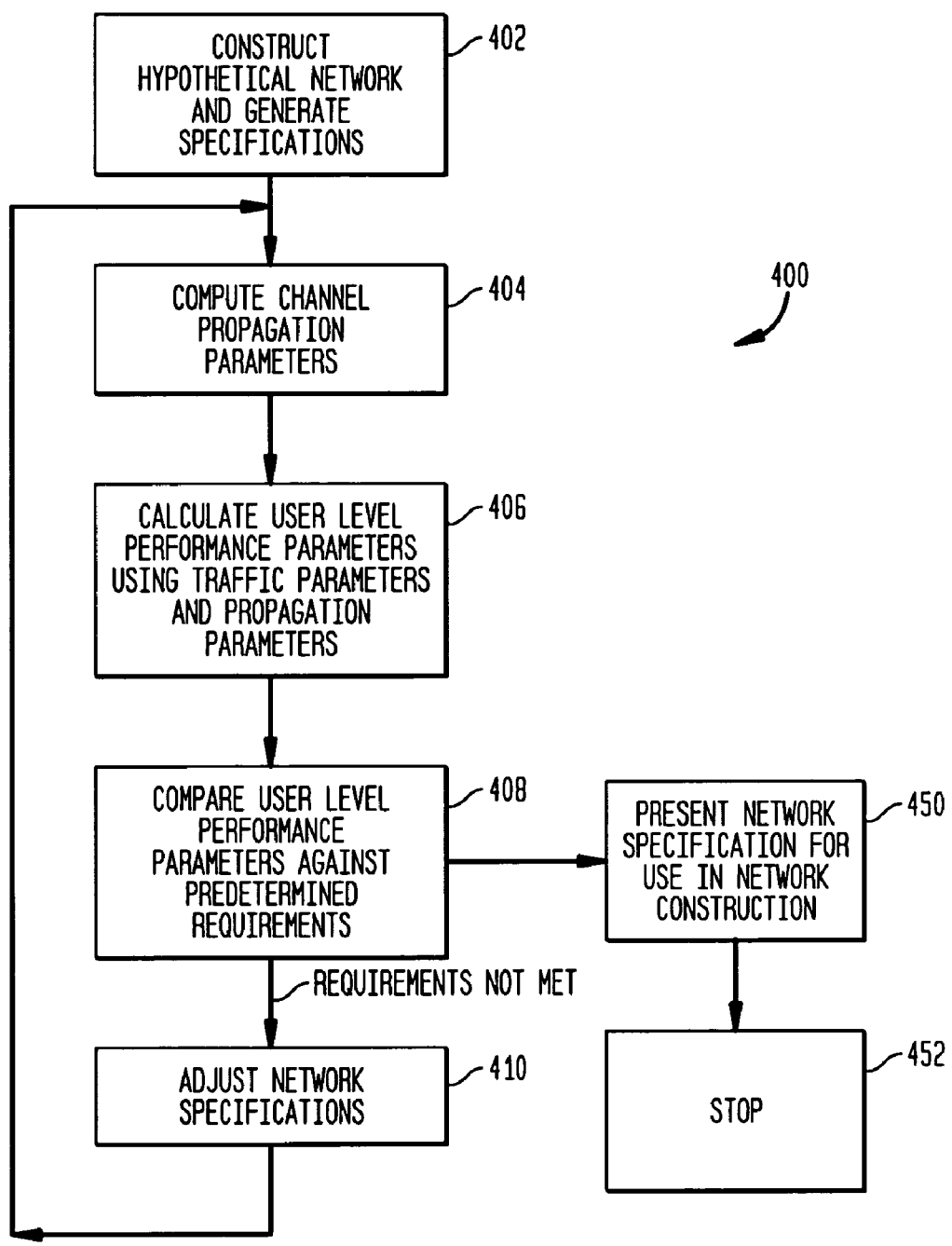
FIG. 4 illustrates the steps of a process of network planning according to an aspect of the present invention.

FIG. 4 illustrates the steps of a process 400 for network design according to an aspect of the present invention. At step 402, upon input of user traffic parameters, a design for an intended network is constructed and specifications for this network are generated. At step 404, channel propagation parameters for the intended network are computed. At step 406, the user traffic parameters and the channel propagation parameters are used as inputs to a model in order to analytically calculate user level performance parameters for the intended network. The parameters may suitably be computed using a processor sharing model. These user level performance parameters include expected user delay, blocking probability and throughput. At step 408, the user level performance parameters are compared against predetermined criteria. If the user level performance parameters do not meet the predetermined criteria, the process proceeds to step 410 and the intended network specifications are adjusted. The process then returns to step 404. If the user level performance parameters meet the predetermined criteria, the process proceeds to step 450 and the network specifications are provided as outputs for use in constructing a network conforming to the specifications. The process then terminates at step 452.

Figure 5:
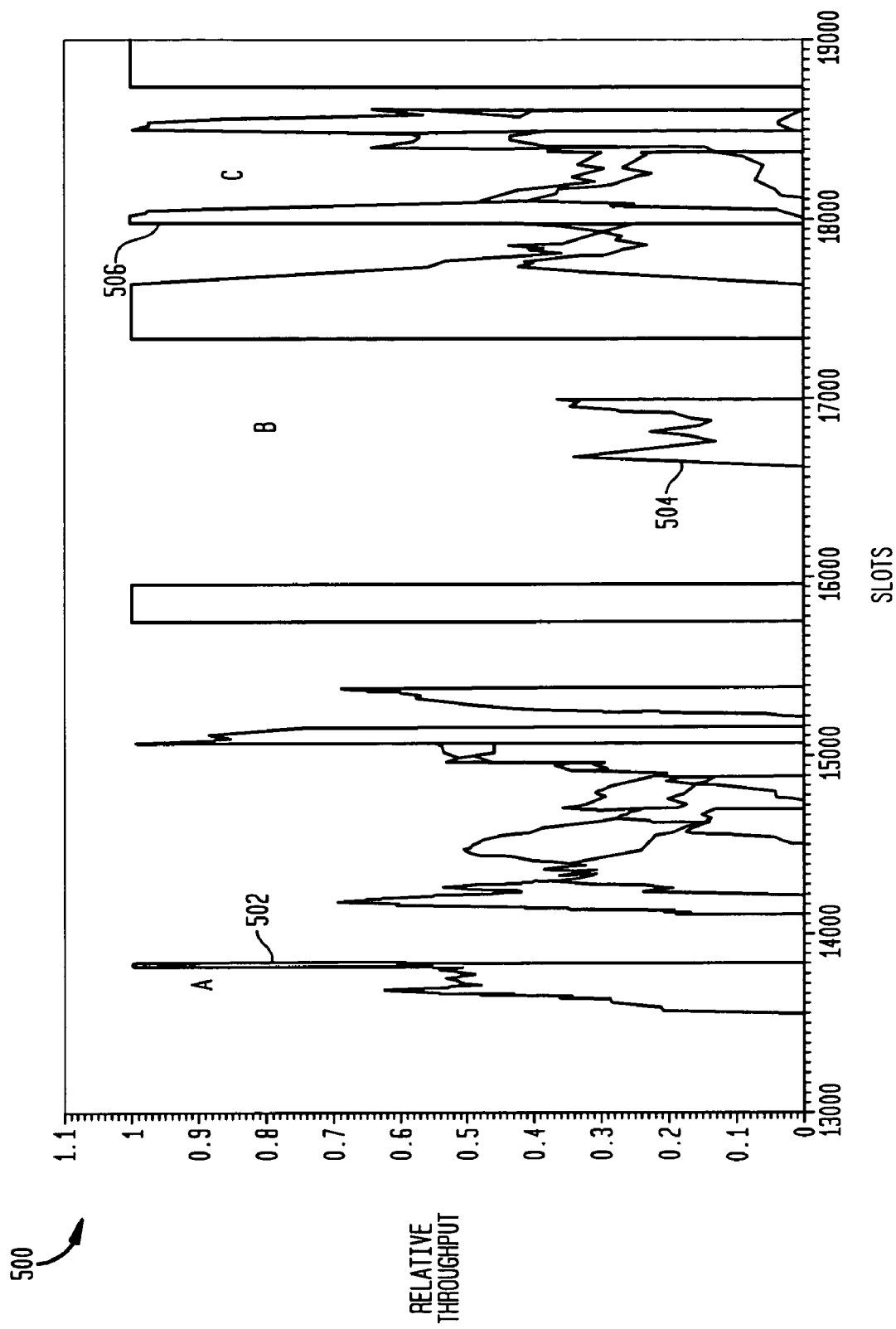
FIGS. 5-7 illustrate comparisons between actual user level parameters and predictions of user level parameters produced by models employed according to the teachings of the present invention.
Figure 6:
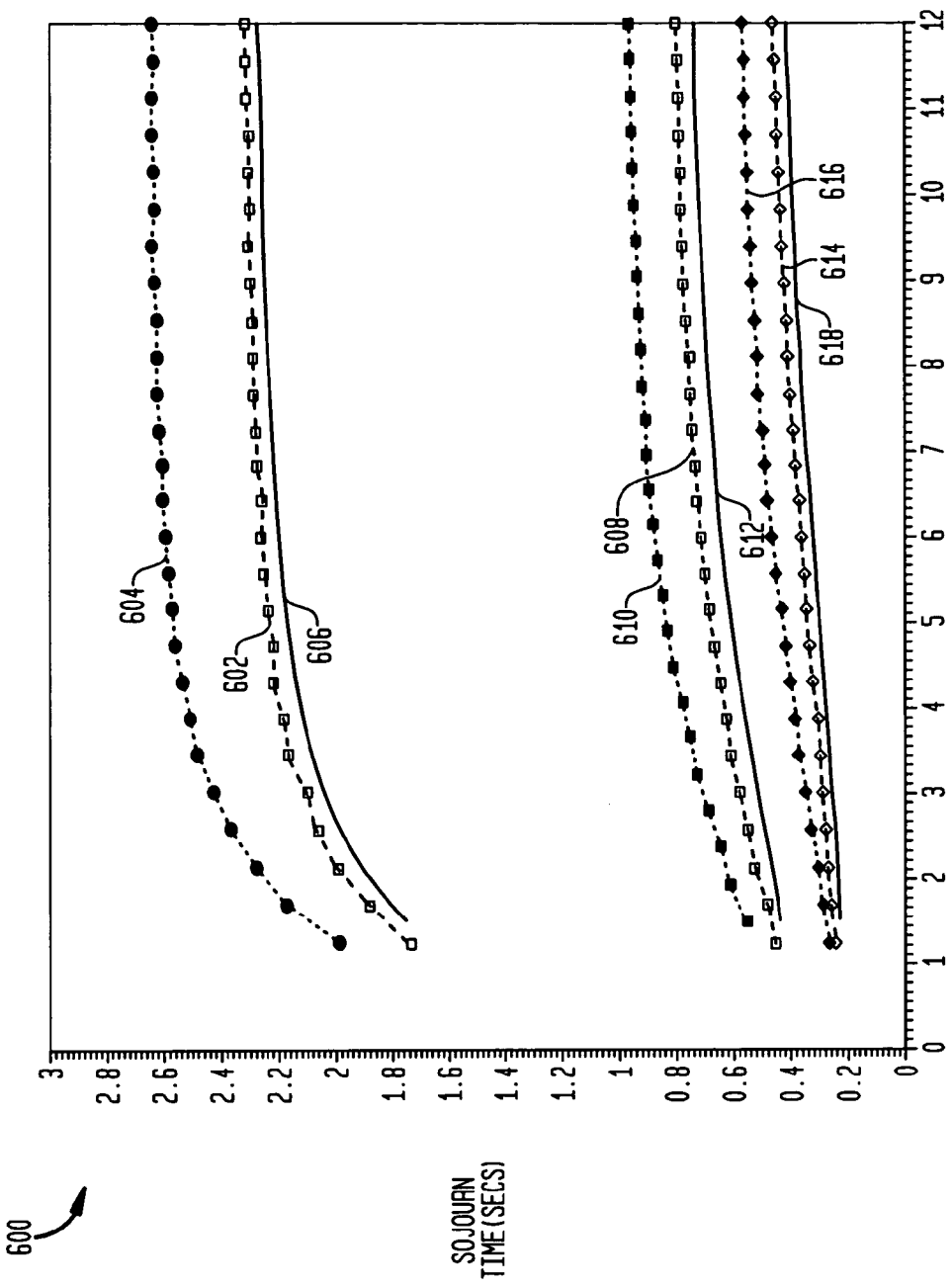
Figure 7:
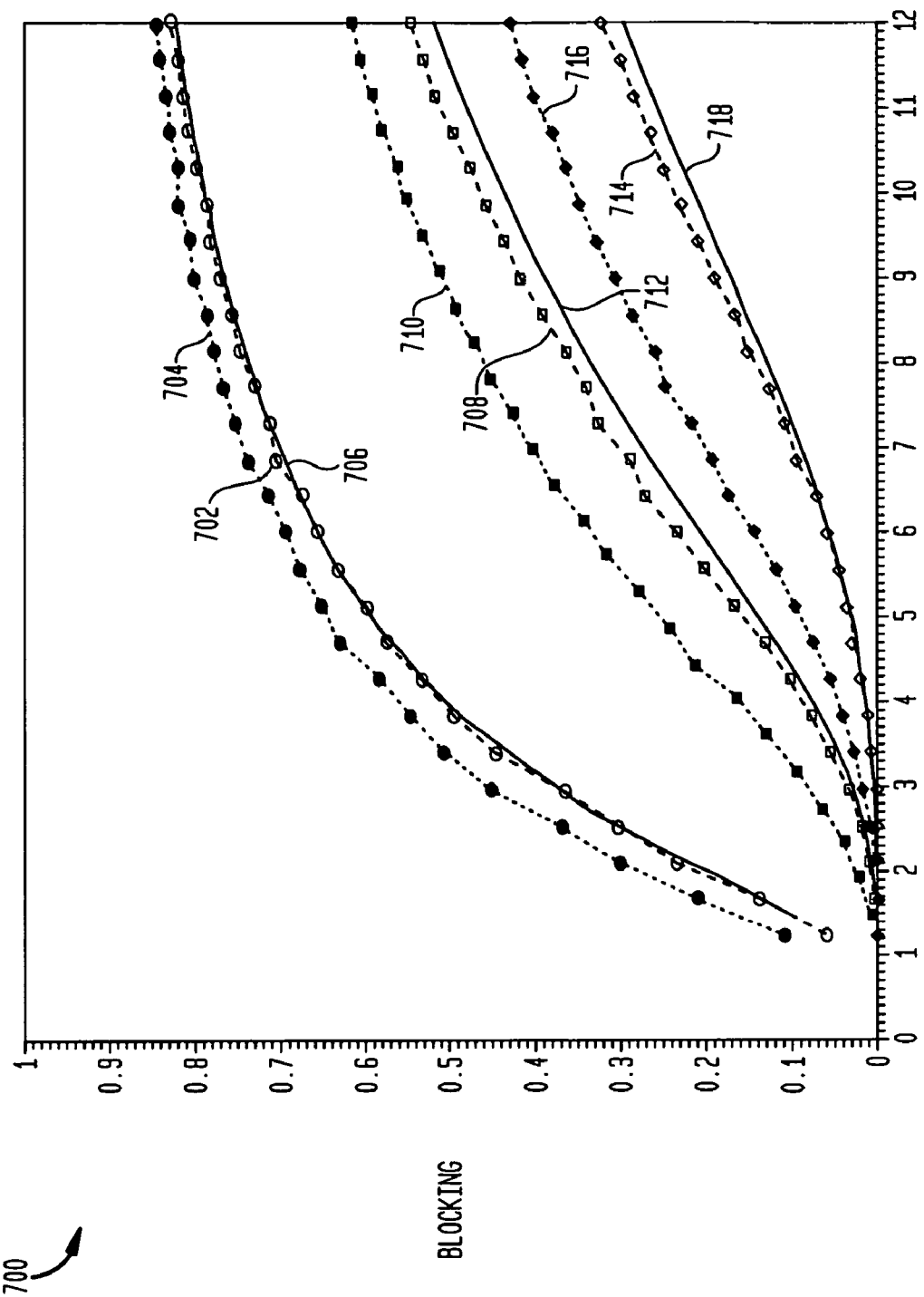

FIGS. 5-7 are graphs showing comparisons between simulations of actual network performance and theoretical results produced by models suitably employed in systems and processes according to the present invention. The results presented in FIGS. 5-7 assume a scenario whereby users submit file transfer requests as a Poisson process of rate λ. The file sizes are assumed to be exponentially distributed. Each arriving user is assumed to generate a single file. The exponential smoothing coefficient for the proportional fair scheduling strategy is set to α=0.001. The users are assumed to have independent Rayleigh fading channels, simulated using a Jakes model. The simulations are all run for 1,000,000 time slots, that is, approximately 1670 seconds of real time, with a warm up period of 100,000 time slots.

FIG. 5 is a graph 500, showing simulation traces 502, 504 and 506, for an arrival rate of λ=1.0 files per second and a mean file size of τ=12.5 kilobytes. The admission threshold is set to K=5, the mean signal to noise ratio, or SNR, is −8 dB for all users, and the Doppler frequency is assumed to be 6 Hz.

It should be noted that the proportional fair strategy allocates a time slot to the user having the maximum instantaneous value of $DRC_i/W_i$. The fact that the values of $W_i$ exhibit significant differences most of the time implies that the proportional fair strategy will not necessarily select the user with the maximum DRC value. In particular, the proportional fair scheduling strategy will allocate time slots to arriving users whose weights are initialized to zero almost regardless of the DRC value. Thus, the rate fluctuations are not maximally exploited, and the actual throughputs received by the users will be lower than assumed in the processor sharing model. As a result, it can be expected that the analytical formulas presented above will be too optimistic and underestimate the mean transfer delay and blocking probability.

This analysis is borne out by the results presented in FIGS. 6 and 7. FIG. 6 illustrates a graph 600, showing sets of curves for simulations and theoretical results with SNR values of −8 dB, −3 dB and 0 dB, admission threshold of K=5 and a file size of 12.5 kilobytes. Curves 602, 604 and 606 use a signal to noise ratio value of −8 dB and show the relationship between arrival rate and sojourn time, that is, expected transfer delay, for equilibrium state, simulation and theoretical results, respectively. The curve 602, showing the equilibrium state, represents a simulation in which the smoothed throughput $W_i$ used in allocating timeslots was replaced by ideal equilibrium values, and the curve 604 illustrates a simulation in which this substitution was not made. Curves 608, 610 and 612 use a signal to noise ratio value of −3 dB and show the relationship between arrival rate and sojourn time for equilibrium state, simulation and theoretical results, respectively. Curves 614, 616 and 618 use a signal to noise ratio value of −0 dB and show the relationship between arrival rate and sojourn time for equilibrium state, simulation and theoretical results, respectively.

FIG. 7 illustrates a graph 700, showing sets of curves for simulations and theoretical results with SNR values of −8 dB, −3 dB and 0 dB. Curves 702, 704 and 706 use a signal to noise ratio value of −8 dB and show the relationship between arrival rate and blocking probability, for equilibrium state, simulation and theoretical results, respectively. Curves 708, 710 and 712 use a signal to noise ratio value of −3 dB and show the relationship between arrival rate and blocking probability for equilibrium state, simulation and theoretical results, respectively. Curves 714, 716 and 718 use a signal to noise ratio value of −0 dB and show the relationship between arrival rate and blocking probability for equilibrium state, simulation and theoretical results, respectively.

The results presented in FIGS. 6 and 7 show that the theoretical results capture the qualitative behavior of the simulations relatively well, despite the presence of some deviation from the exact values. The expected delays and blocking probabilities increase with the arrival rate, quite steeply at first, but later flatten out as the system saturates due to the admission control, quantified by the admission control value K=5. The mean transfer delay then approaches the value τ/R(γ)G(20,γ).

The values illustrated in the curves 602, 608 and 614 and the curves 702, 708 and 714, in which the ideal equilibrium values were used in the simulation, are closer to the values illustrated by the curves 606, 612 and 618 and the curves 706, 712 and 718 than are the values illustrated by the curves 604, 610 and 616 and the curves 704, 710 and 716, in which the simulation took place without the substitution of ideal equilibrium values. These results suggest that the chief source of discrepancies between the results produced using models employed according to the present invention arises from the fact that the smoothed throughputs differ significantly from the ideal equilibrium values due to user dynamics. The results further suggest that an improvement can be made to the performance of a system using a proportional fair scheduling strategy by initialized the weights used in allocating the time slots so that they are closer to the ideal equilibrium values.

While the present invention is disclosed in the context of a presently preferred embodiment, it will be recognized that a wide variety of implementations may be employed by persons of ordinary skill in the art consistent with the above discussion and the claims which follow below.

We claim:

1. A network planning system for determining specifications for a wireless network, comprising:
    an input module configured to receive traffic statistics for the wireless network;
    a processing module configured to receive the traffic statistics and generating the specifications for an intended network, the processing module being operative to construct a design for the intended network and generate the specifications for the intended network, the constructed design of the intended network comprising a layout of base stations and antennae configurations of the base stations, the processing module being operative to compute user level performance parameters for the intended network using a processor sharing queuing model, the processing module being operative to directly compute the user level performance parameters based on the traffic statistics and the generated network specifications, the processing module being further operative to compare the user level performance parameters against predetermined requirements and to repeatedly adjust the generated network specifications, compute new user level performance parameters and compare the user level performance parameters against the predetermined requirements until a set of generated network specifications produces user level performance parameters meeting the requirements; and
    an output module configured to present the network specifications generated by the processing module, wherein the generation of the network specification is performed by an optimization application existing as software executed by the processing module, wherein the optimization application includes a network specifications module configured to generate the original and adjusted intended network specifications and a user level performance module configured to compute the user level performance parameters based on the network specifications and the traffic statistics, wherein the network specifications module computes propagation parameters based on the network specifications and supplies the propagation parameters to the user level performance module for use in computing the user level performance parameters, wherein the user level performance module computes expected delay, blocking probability and throughput based on the traffic statistics and the network specifications, wherein the user level performance module is operative to select from among models for computing performance parameters for file transfer applications and models for computing performance parameters for hypertext markup language page browsing applications.

2. The system of claim 1, wherein the traffic statistics include arrival rate information and information indicating an amount of data to be transmitted, such data including average file and page size and average number of file and page requests per session.

3. A user level performance module for determining user level performance parameters for a wireless network, comprising:
    a network specifications module configured to receive and assembling network information for use in computing the user level performance parameters and in constructing a network design including a layout of a plurality of base stations and antennae configurations for the plurality of base stations;
    a processing module configured to use the network information to compute user level parameters, the model selection and processing module being operative to select and employ one or more analytical models to compute the user level parameters, the models including processor sharing queuing models; and
    a results output module configured to assemble and storing the results generated by the processing module, wherein the network information includes network traffic and propagation information, wherein the processing module is operative to select from among models for computing performance parameters for file transfer applications and models for computing performance parameters for hypertext markup language page browsing applications.

* * * * *